United States Patent [19]

Alting et al.

[11] 4,391,622
[45] Jul. 5, 1983

[54] METHOD FOR THE PRECISION/MANUFACTURE OF GLASS ARTICLES

[75] Inventors: Cornelis L. Alting; Rudolf Brehm; Jan Haisma, all of Eindhoven, Netherlands

[73] Assignee: U.S. Philips Corporation, New York, N.Y.

[21] Appl. No.: 264,738

[22] Filed: May 18, 1981

[30] Foreign Application Priority Data

May 28, 1980 [NL] Netherlands ............... 8003050

[51] Int. Cl.³ .............. C03B 11/08; C03B 40/00
[52] U.S. Cl. ............................. 65/66; 65/26; 65/83; 65/374.11; 65/374.13
[58] Field of Search ............. 65/66, 26, 374, 83, 65/84, 85, 61, 374.13, 374.11

[56] References Cited

U.S. PATENT DOCUMENTS 2,160,433 5/1939 McCauley .
3,155,748 11/1964 Couri .................... 65/104 X
3,244,497 4/1966 Copeland .................. 65/26 X

OTHER PUBLICATIONS

Glass Engineering Handbook, E. B. Shand, pp. 17, 18, 32-36, 2nd Edition, 1958.
Handbook of Glass Manufacturing, F. U. Tooley, pp. 16, 17, 18, 1953.

Primary Examiner—Arthur D. Kellogg
Attorney, Agent, or Firm—Paul R. Miller

[57] ABSTRACT

By using special dies, lenses from glass can be manufactured with great precision. Such dies are manufactured from quartz glass. Quartz glass can be worked with the required shape accuracy and the required smoothness, for example, by a polishing treatment succeeded by sputtering.

3 Claims, 1 Drawing Figure

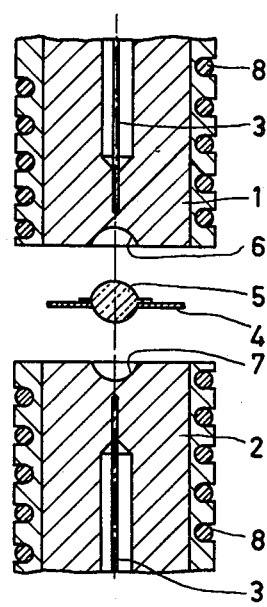

METHOD FOR THE PRECISION/MANUFACTURE OF GLASS ARTICLES

The invention relates to a method for the precision-manufacture of glass articles, in which a glass is moulded in a mould or pressed in a die. The invention also relates to a method of manufacturing a mould or die for the precision-moulding or pressing of glass articles and to a mould or die for the precision-moulding or pressing of glass articles.

The invention relates in particular to the precision-moulding or pressing of glass lenses, for example, aspherical lenses. Such lenses must have a given shape accuracy and a certain smoothness. "Precision" is to be understood to mean in this connection that the lens immediately after moulding or pressing, that is to say, without the lens having been subjected to a subsequent polishing treatment, deviates at no point on the surface more than 0.5 $\mu m$ from the desired curvature.

U.S. Pat. No. 4,098,596 discloses a method of pressing optical lenses in a die. The die is manufactured from tungsten carbide, a tungsten alloy or of glassy carbon. Metals have the disadvantage of changing their crystal structure (grain growth, crystallization, and the like) as a result of the temperature cycles which occur during the moulding and hot pressing of glass. This is often associated with geometrical changes, with the result that dies of metal can only be used a restricted number of times. Glassy carbon has the disadvantage of being difficult to work mechanically to the desired smoothness with the required shape accuracy.

The invention provides a solution to mitigate the above-described problems.

The method according to the invention is characterized in that a mould or die is used which, at least at its contact surfaces with the glass, is manufactured from quartz glass or glass ceramic having a coefficient of linear expansion ($\alpha$) of less than $60 \times 10^{-8}$ per °C.

Dies of quartz glass for pressing lenses of synthetic resin are known per se from British Patent Specification No. 505,836.

The mould or die used in the method according to the invention can be manufactured by grinding and polishing of quartz or ceramic. A particularly simple method of manufacturing the mould or die comprises the following steps:

(1) a preform which, at least at its contact surfaces with the glass articles to be manufactured, consists of quartz glass or glass ceramic having a coefficient of linear expansion ($\alpha$) of less than $60 \times 10^{-8}$ per °C., is worked mechanically, for example, by polishing on a polishing lathe, which is a lathe on which the chisel is replaced by a polishing spindle, to an accuracy of a few tenths of a micrometer relative to the required shape and to smoothness (that is to say, to a surface roughness of less than 0.02 $\mu m$); and (2) is then sputtered by means of an ion beam to an accuracy of less than 0.1 $\mu m$ relative to the required shape.

The above-described method of manufacturing a mould or die is not suitable for the manufacture of moulds or dies from metals and glass carbon. In the case of metals the surface losses its smoothness upon sputtering with the ion beam in that an attack occurs at the grain boundaries of the metal. Glassy carbon cannot be worked to be sufficiently smooth to the required accuracy neither by means of a polishing lathe nor by means of sputtering.

The mould or die according to the invention is characterized in that the mould or die, at least at its contact surface with the glass, is manufactured from quartz glass or glass ceramic having a coefficient of linear expansion ($\alpha$) of less than $60 \times 10^{-8}$ per °C.

The mould or die in accordance with the invention can be used more often than the known metal dies because in use no variations in shape occur as a result of structure variations.

Glass articles can be manufactured by means of the mould or die in accordance with the invention at temperatures up to approximately 1000° C. The glass articles are preferably manufactured by hot-pressing at temperatures of 300°–600° C. Suitable in particular for such hot-pressing are glasses with an American softening point (that is to say, the temperature at which the viscosity is $10^{6.6}$ Pa.s) of less than 600° C.

The requirement is imposed upon the quartz glass or the glass ceramic which is used for the mould or die that the coefficient of linear expansion is less than $60 \times 10^{-8}$ per °C. Such a low coefficient of expansion is necessary to ensure that the glass article after the manufacture in the mould or die easily detaches from the mould or die due to a higher degree of shrinkage of the glass than of the material of the mould or die. The usual optical glasses have a coefficient of linear expansion of approximately $500$–$1500 \times 10^{-8}$ per °C. Suitable quartz glasses or glass ceramic according to the present invention are Zerodur (an amorphous $SiO_2$ with a few % by weight of $TiO_2$), ULE (an amorphous $SiO_2$ with 7.5% by weight of $TiO_2$) and Homosil (a pure quartz glass of Heraeus). The coefficient of linear expansion of these materials is as follows:

Zerodur (0°–40° C.): 0 per °C.
ULE (0°–40° C.): $10 \times 10^{-8}$ per °C.
Homosil (0°–40° C.): $60 \times 10^{-8}$ per °C.

The invention will now be described in greater detail, by way of example, with reference to a drawing, the sole FIGURE of which is a sectional view of a press with dies according to the invention.

The drawing FIGURE shows two die halves (1) and (2) each having a thermo-couple (3). The contact faces are denoted by (6) and (7). A heating wire (8) is shown with which the die can be heated to the desired temperature by a supply and control not shown. The pressed glass article (5) is present on a support (4).

The die halves are preferably manufactured as follows. A preform is manufactured from molten quartz by grinding and drilling. The surface of the preform is dull as a result of the roughness of the surface. The preform is etched chemically so as to obtain a surface which is substantially free from hair cracks. The contact face (6) or (7) is worked on a special polishing lathe as described in Philips Technical Review 30 117–113 (1969) in such a manner that the surface differs by no more than a few tenths of a micrometer from the desired surface and the surface roughness is less than 0.02 $\mu m$ (that is to say, is optically smooth). The die surface is then measured and sputtered by means of a numerically controlled ion beam to a shape accuracy of less than 0.1 micrometer. The surface of quartz glass and glass ceramic remains optically smooth. Sputtering by means of an ion beam is carried out in the manner as described in J. B. Schroeder et al, Technical Feasibility of figuring Optical Surfaces by Ion Polishing, Applied Optics, 10, pp. 295–299

(1971). This literature reference is deemed to be incorporated by reference.

By means of the above-described pressing dies, lenses can be pressed as follows. A preform, for example, a finely ground cube of glass, is heated at a temperature in the proximity of or slightly higher than the American softening point of the glass in question. The cube on a support (4) is then provided between the die halves (1) and (2) preheated, for example, at approximately 300° C. The glass cube is then pressed under pressure between the die halves (pressure, for example 400-700 kPa) for a few seconds. The pressed article 5 is then removed from between the die halves and is cooled, for example, in air.

EXAMPLE

Lenses from different kinds of glass were pressed in the device shown in the FIGURE. For that purpose, a cube having a dimension of 8×8×8 mm was pressed between the die halves at the above indicated pressing temperature. The die halves were manufactured from molten quartz glass ($\alpha \approx 50 \times 10^{-8}$ per °C.). The shape accuracy (that is to say, the deviation relative to the ideal shape and the smoothness) of the contact surfaces of the respective die halves were less than 0.1 μm and less than 0.02 μm, respectively. All pressed lenses had a shape accuracy of less than 0.1 μm and a smoothness of less than 0.02 μm. Therefore these lenses needed no longer to be polished. In the Table A below the composition of the glasses used and the press temperatures used is given. The time within which the glass detaches from the die by shrinkage (detachment time) is also stated.

TABLE

| glass no. | glass composition | coefficient of expansion per °C. | pressing temperature | detachment time |
|---|---|---|---|---|
| (1) | FK3 (optical glass of Schott) | $820 \times 10^{-8}$ | 750° C. | approx. 5 sec. |
| (2) | 87 wt. % PbO; 10 wt. % SiO$_2$; 1 wt. % Sb$_2$O$_3$; 1 wt. % B$_2$O$_3$; 0.5 wt. % K$_2$O; 0.5 wt. % remaining | $940 \times 10^{-8}$ | 470° C. | 5-30 sec. |
| (3) | 47 mol. % P$_2$O$_5$; 9 mol. % Li$_2$O; 19 mol. % BaO; 19 mol. % PbO; 0.9 mol. % Al$_2$O$_3$; 5.1 at. % F | $135 \times 10^{-8}$ | 440° C. | 8-20 sec. |
| (4) | As$_2$S$_3$ | $2240 \times 10^{-8}$ | 325° C. | less than 10 sec. |

I claim:
1. In a method for precision manufacture of glass articles molded in a mold or hot-pressed in a die, the improvement comprises the step of using a mold or die having at least contact surfaces made from quartz glass or an amorphous SiO$_2$ with upto 7.5% by weight of TiO$_2$ with a coefficient of linear expansion of at most $60 \times 10^{-8}$ per °C., wherein said glass articles have a substantially higher coefficient of linear expansion.
2. A method according to claim 1, wherein pure quartz glass having a coefficient of linear expansion of at most $60 \times 10^{-8}$ per °C. is used to form said contact surfaces.
3. A method according to claim 1, wherein glass ceramic being amorphous SiO$_2$ with upto 7.5% by weight of TiO$_2$ and having a coefficient of linear expansion ranging from 0 per °C. to $10 \times 10^{-8}$ per °C. is used to form said contact surfaces.

* * * * *

UNITED STATES PATENT AND TRADEMARK OFFICE
CERTIFICATE OF CORRECTION

PATENT NO. : 4,391,622

DATED : July 5, 1983

INVENTOR(S) : CORNELIS L. ALTING ET AL

It is certified that error appears in the above—identified patent and that said Letters Patent is hereby corrected as shown below:

On the title page

Please change "[30] Foreign Application Priority Data May 28, 1980[NL] Netherlands .......8003050" to -- [30] Foreign Application Priority Data May 28, 1980 [NL] Netherlands .......8003058--.

Signed and Sealed this

Thirteenth Day of September 1983

[SEAL]

Attest:

GERALD J. MOSSINGHOFF

Attesting Officer

Commissioner of Patents and Trademarks